Patented Nov. 3, 1936

2,059,495

UNITED STATES PATENT OFFICE 2,059,495

CATALYTIC PURIFICATION OF OXYGEN-CONTAINING HYDROGENATION PRODUCTS OF OXIDES OF CARBON

Karl Smeykal, Leuna, Germany, assignor to I. G. Farbenindustrie Aktiengesellschaft, Frankfort-on-the-Main, Germany No Drawing. Application November 29, 1932, Serial No. 644,837. In Germany December 5, 1931

12 Claims. (Cl. 260—156)

The present invention relates to improvements in the catalytic purification of oxygen-containing hydrogenation products of oxides of carbon.

By maintaining certain reaction conditions in the catalytic hydrogenation of oxides of carbon, in particular of carbon monoxide, as for example when employing a high partial pressure, especially above 30 per cent of the total pressure, of carbon monoxide, or when bringing the reacting materials into contact with the catalysts for a long time or when working in the presence of catalysts containing alkalies, in addition to methyl alcohol, oxygen-containing reaction products of high boiling point may be obtained which consist for the greater part of higher alcohols and other oxygen-containing organic compounds. These products, in particular those boiling above 110° C. only find employment with difficulty in practice because they have an unpleasant penetrating odor and are yellow in color. By the usual purifying methods, as for example distillation or treatment with absorbent agents, it is not possible to obviate the said objectionable properties. A catalytic purification of the said products has therefore already been proposed according to which the products, if desired after a previous treatment with purifying agents, as for example by passage at elevated temperatures over absorbing agents, such as active charcoal, are treated in the liquid phase under atmospheric, reduced or increased pressure and at elevated temperatures with hydrogen in the presence of finely divided metals, or subjected to a catalytic hydrogenation in the gaseous phase at atmospheric pressure.

I have now found that the catalytic purification with hydrogen of oxygen-containing hydrogenation products of oxides of carbon may be carried out especially advantageously industrially and with excellent results by working at pressures of more than 50 atmospheres, at temperatures of from 100° to 300° C. and in the presence of metal oxygen compounds not reducible to metals under the reaction conditions or of sulphidic compounds, said metal oxygen compounds or sulphidic compounds being derived from the heavy metals of groups 1, 2, 4, 5, 6 or 8 of the periodic system, or in the presence of mixtures of these metal oxygen compounds and sulphidic compounds. Of particular advantage are the metal oxygen compounds and the sulphidic compounds of metals from groups 6 of the periodic system. The term "metal oxygen compounds not reducible to metal" is intended to comprise metal oxides and hydroxides; furthermore salts of acids, from which the acid may be driven out by heat, such as carbonates; and also metal oxides or hydroxides which are combined with acids in a complex form, such as complex compounds of phosphoric acid or silicic acid with molybdic acid or tungstic acid, as for example ammonium phosphomolybdate. Oxides of metals when combined with acid in a non-complex form to form salts from which the acid cannot be volatilized, such as sulphates or silicates or phosphates, however, are not comprised within the said term. As examples of metals, from which the oxidic or sulphidic compounds may be derived in the present case may be mentioned copper, silver (the latter preferably in combination with molybdic acid, tungstic acid or vanadic acid), zinc, cadmium, tin, lead, vanadium, bismuth, chromium, molybdenum, tungsten, uranium, nickel and cobalt. But also the other heavy metals of the aforementioned groups of the periodic system are useful. The compounds obtainable from salts of metal acids of the 5th or 6th group of the periodic system by complete or partial reduction with hydrogen sulphide have a specially advantageous catalytic action.

The catalysts may be employed in any form, as for example as dust, pieces or in pressed form, either alone or in conjunction with carrier substances such as pumice stone, coke, animal charcoal, active charcoal or clay. The catalysts are distinguished by activity through very long periods of time so that even after use for several months no reduction in activity can be observed. The oxygen-containing products to be purified may be employed in the liquid or vaporous phase. For example the purification may be carried out in rotary or stirring autoclaves with pulverulent catalysts or in trickling towers with rigidly arranged catalysts. The liquids to be purified may also be evaporated under pressure and led together with hydrogen at a pressure, preferably, of about 200 atmospheres over the catalysts, the purified products then being condensed. In most cases a single treatment is sufficient, but sometimes, especially in cases where an especially extensive purification is necessary, the treatment may be repeated.

A certain amount of reduction of the alcohols present to form hydrocarbons may take place during the said treatment depending on the height of the purification temperature employed. The separation of the hydrocarbons formed by reduction of the alcohols may be readily effected by fractional distillation of the purified product because the hydrocarbons boil at much lower temperatures than the corresponding alcohols. In order to obtain a good separation of the hydrocarbons from the unchanged alcohols it is advantageous to carry out the purification with fractions of comparatively restricted boiling point range, as for example of from 120° to 180° C.

Since the initial materials usually contain a small amount of sulphur (about 0.01 per cent), the purified products contain traces of hydrogen sulphide which is formed by degradation of the sulphur compounds. This may be readily removed in the usual manner by an aftertreatment with desulphurizing agents, as for example with alkali metal or alkaline earth metal oxides or hydroxides.

The final products obtained are entirely colorless liquids having a pleasant odor, the original solvent power of which has not been reduced by the purification process.

The purified alcohols, by reason of their property of assisting the dissolution of lower alcohols and benzine, may be employed with special advantage as additions to fuels containing alcohols.

The following examples will further illustrate the nature of this invention but the invention is not restricted to these examples.

Example 1

The fraction, boiling between 120° and 180° C., of a product, obtained by the catalytic hydrogenation of carbon monoxide, having an unpleasant odor, a yellow color and a sulphur content of 0.07 per cent is allowed to trickle down at 200° C. under a pressure of 200 atmospheres of hydrogen over a rigidly arranged catalyst filling consisting of pieces of a composition of nickel sulphide and tungsten sulphide obtainable by treating nickel tungstate with hydrogen sulphide while heating. The amount of liquid passed through per hour is equal to the volume of the catalyst.

In order to separate the hydrocarbons formed from the unchanged alcohols, the product is subjected to a fractional distillation. 10 per cent of the total amount passes over between 50° and 110° C. as first runnings which consist mainly of hydrocarbons and water. The constituents of higher boiling point (90 per cent) consist of pure alcohols having a boiling point of from 120° to 180° C. In order to remove small amounts of hydrogen sulphide therefrom they are shaken with 2 per cent by weight of powdered gas purifying mass and then filtered. The alcohols thus purified are entirely colorless and have a pleasant odor. The sulphur content is reduced to 0.005 per cent.

The purified alcohols are eminently suitable as solvents for resins and as agents for assisting the dissolution of alcohol motor fuels. A mixture of 15 volumes of methanol and 80 volumes of motor benzine, which separates into its components at 20° C., has incorporated therewith 5 volumes of the said purified alcohols. Mixing immediately takes place and a homogeneous liquid is obtained which first separates into its components when cooled to 20° C. below zero. During the combustion of the said fuel mixture in a motor, the exhaust gases have no unpleasant odor.

Example 2

The initial fraction specified in Example 1 is vaporized in a stream of hydrogen and led under a pressure of 200 atmospheres at 250° C. over pieces of catalyst consisting of equimolecular amounts of zinc oxide, magnesium oxide and molybdic acid anhydride, the amount of crude alcohols (measured as a liquid) passed through per hour being equal to the volume of the catalyst. The reaction products are condensed and, after releasing the pressure, worked up and purified as described in Example 1. About 10 per cent of the product obtained by the catalytic purification consists of hydrocarbons and water. The resulting alcohols having a boiling point of from 120° to 180° C. are colorless and have a pleasant odor.

Example 3

The same fraction as described in Example 1 is vaporized in a stream of hydrogen and passed under a pressure of 200 atmospheres and at a temperature of 265° C. over a catalyst consisting of pressed pieces of nickel sulpho-vanadate. The amount of crude alcohols (measured as a liquid) which is passed through per hour is equal to the volume of the catalyst employed. The resulting products are condensed and further worked up as described in Example 1. About 15 per cent of the purified product consists of hydrocarbons and water. The resulting alcohols are colorless and have an agreeable odor.

Example 4

The fraction described in Example 1 is passed, under the conditions of pressure and temperature described in Example 2, with hydrogen over a catalyst consisting of pieces of manganese molybdate. The procedure and the further working up of the reaction products is the same as that described in Examples 2 and 3. The catalytically purified products consist of 5 per cent of hydrocarbons and water. The resulting alcohols are colorless and a considerable improvement in the odor as compared with the initial material is obtained.

What I claim is:

1. A process for the purification of an oxygen-containing hydrogenation product of an oxide of carbon which comprises treating this product with hydrogen at a temperature between 100° and 300° C., under a pressure of at least 50 atmospheres and in the presence of a catalyst comprising essentially a compound selected from the group consisting of the sulphides of the heavy metals of groups 1, 2, 4, 5, 6, and 8 of the periodic system, those oxygen compounds of the said heavy metals which upon heating leave behind oxides not easily reduced under the reaction conditions, and the oxides and hydroxides of the said heavy metals which are combined with acids in a complex form.

2. A process for the purification of an oxygen-containing hydrogenation product of carbon monoxide which comprises treating this product with hydrogen at a temperature between 100° and 300° C., under a pressure of at least 50 atmospheres and in the presence of a catalyst comprising essentially a compound selected from the group consisting of the sulphides of the heavy metals of groups 1, 2, 4, 5, 6, and 8 of the periodic system, those oxygen compounds of the said heavy metals which upon heating leave behind oxides not easily reduced under the reaction conditions, and the oxides and hydroxides of the said heavy metals which are combined with acids in a complex form.

3. A process for the purification of an oxygen-containing hydrogenation product of carbon monoxide which comprises treating this product with hydrogen at a temperature between 100° and 300° C., under a pressure of at least 50 atmospheres and in the presence of a catalyst comprising essentially a sulphide and an oxygen compound selected from the group consisting of sulphides of the heavy metals of groups 1, 2, 4, 5, 6 and 8 of the periodic system, those oxygen compounds of the said heavy metals which upon heating leave behind oxides not easily reduced under the reaction conditions, and the oxides and hydroxides of the said heavy metals which are combined with acids in a complex form.

4. A process for the purification of an oxygen containing hydrogenation product of an oxide of carbon which comprises treating a fraction of this product boiling above 110° C. with hydrogen at a temperature between 100° and 300° C., under a pressure of at least 50 atmospheres and in the presence of a catalyst comprising essentially a compound selected from the group consisting of the sulphides of the heavy metals of groups 1, 2, 4, 5, 6, and 8 of the periodic system, those oxygen compounds of the said heavy metals which upon heating leave behind oxides not easily reduced under the reaction conditions, and the oxides and hydroxides of the said heavy metals which are combined with acids in a complex form.

5. A process for the purification of an oxygen-containing hydrogenation product of carbon monoxide which comprises treating a fraction of this product boiling above 110° C. with hydrogen at a temperature between 100° and 300° C., under a pressure of at least 50 atmospheres and in the presence of a catalyst comprising essentially a compound selected from the group consisting of the sulphides of the heavy metals of groups 1, 2, 4, 5, 6, and 8 of the periodic system, those oxygen compounds of the said heavy metals which upon heating leave behind oxides not easily reduced under the reaction conditions, and the oxides and hydroxides of the said heavy metals which are combined with acids in a complex form.

6. A process for the purification of an oxygen-containing hydrogenation product of an oxide of carbon which comprises treating this product with hydrogen at a temperature between 100° and 300° C., under a pressure of at least 50 atmospheres and in the presence of a catalyst comprising essentially a sixth group metal sulphide.

7. A process for the purification of an oxygen-containing hydrogenation product of carbon monoxide which comprises treating this product with hydrogen at a temperature between 100° and 300° C., under a pressure of at least 50 atmospheres and in the presence of a catalyst comprising essentially a sixth group metal sulphide.

8. A process for the purification of an oxygen containing hydrogenation product of an oxide of carbon which comprises treating a fraction of this product boiling above 110° C. with hydrogen at a temperature between 100° and 300° C., under a pressure of at least 50 atmospheres and in the presence of a catalyst comprising essentially a sixth group metal sulphide.

9. A process for the purification of an oxygen containing hydrogenation product of an oxide of carbon which comprises treating a fraction of this product boiling within the range from 120° C. to 180° C. with hydrogen at a temperature between 100° and 300° C., under a pressure of at least 50 atmospheres and in the presence of a catalyst comprising essentially a compound selected from the group consisting of the sulphides of the heavy metals of groups 1, 2, 4, 5, 6 and 8 of the periodic system, those oxygen compounds of the said heavy metals which upon heating leave behind oxides not easily reduced under the reaction conditions, and the oxides and hydroxides of the said heavy metals which are combined with acids in a complex form.

10. A process for the purification of an oxygen-containing hydrogenation product of carbon monoxide which comprises treating a fraction of this product boiling within the range from 120° C. to 180° C. with hydrogen at a temperature between 100° and 300° C., under a pressure of at least 50 atmospheres and in the presence of a catalyst comprising essentially a compound selected from the group consisting of the sulphides of the heavy metals of groups 1, 2, 4, 5, 6 and 8 of the periodic system, those oxygen compounds of the said heavy metals which upon heating leave behind oxides not easily reduced under the reaction conditions, and the oxides and hydroxides of the said heavy metals which are combined with acids in a complex form.

11. A process for the purification of an oxygen-containing hydrogenation product of an oxide of carbon which comprises treating a fraction of this product boiling within the range from 120° C. to 180° C. with hydrogen at a temperature between 100° and 300° C., under a pressure of at least 50 atmospheres and in the presence of a catalyst comprising essentially a sixth group metal sulphide.

12. A process for the purification of an oxygen-containing hydrogenation product of carbon monoxide which comprises treating a fraction of this product boiling within the range from 120° C. to 180° C. with hydrogen at a temperature between 100° and 300° C., under a pressure of at least 50 atmospheres and in the presence of a catalyst comprising essentially a sixth group metal sulphide.

KARL SMEYKAL.